T. LALOR.

Assignor, by mesne assignments, to W. F. BEASLEY.

Register for Indicator-Locks.

No. 8,213. Reissued May 7, 1878.

WITNESSES:

Jas. E. Hutchinson

Henry C. Hazard

ASSIGNEE.

Wm. F. Beasley, by

Prindle and Co. his Attys

N. PETERS, PHOTO-LITHOGRAPHER, WASHINGTON, D. C.

UNITED STATES PATENT OFFICE.

WILLIAM F. BEASLEY, OF BALTIMORE, MARYLAND, ASSIGNEE, BY MESNE ASSIGNMENTS, OF THOMAS LALOR.

IMPROVEMENT IN REGISTERS FOR INDICATOR-LOCKS.

Specification forming part of Letters Patent No. 80,637, dated August 4, 1868; Reissue No. 8,213, dated May 7, 1878; application filed April 16, 1878.

DIVISION B.

*To all whom it may concern:*

Be it known that THOMAS LALOR, of Toronto, Canada, did invent certain new and useful Improvements in Registers, for which Letters Patent No. 80,637 were issued upon the 4th day of August, 1868, which Letters Patent have been found defective, in that the specification and claims do not cover and embrace all of the original invention as set forth in the application filed in the Patent Office on the 18th day of June, 1868. Now, therefore, being desirous of reissuing said Letters Patent herewith surrendered, I have prepared and do hereby declare that the following is a full, clear, and exact description of the said invention, reference being had to the accompanying drawing, making a part of this specification, in which—

Figure 1:
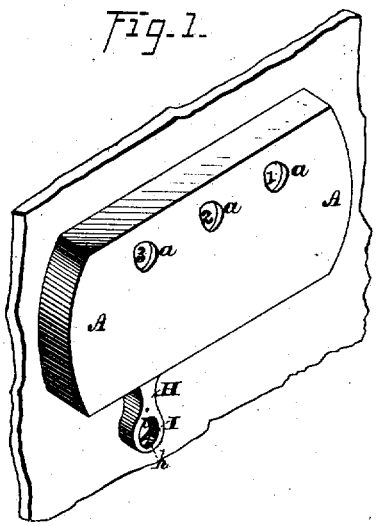
Figure 2:
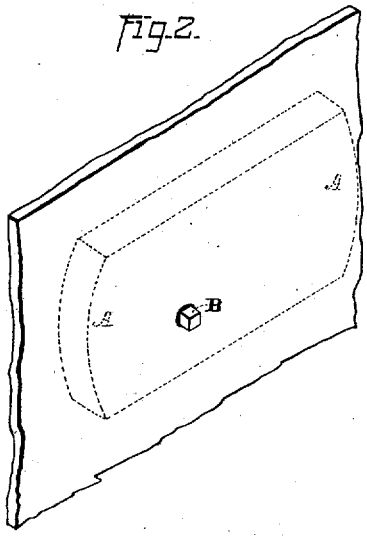
Figure 3:
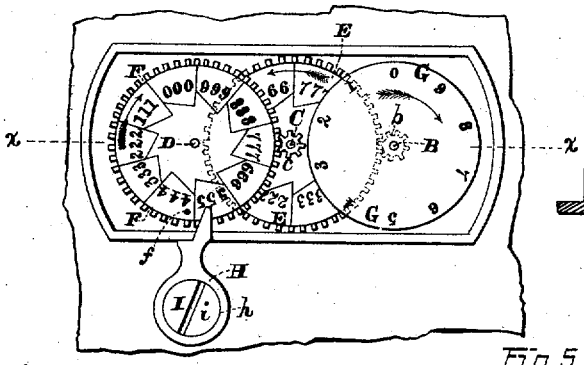
Figure 4:
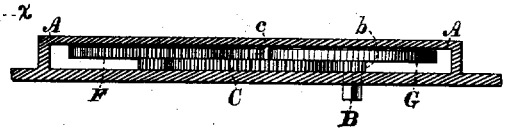
Figure 5:
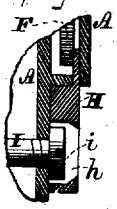

Figure 1 is a perspective view of the front side of the register-casing. Fig. 2 is a like view of the rear side of the same. Fig. 3 is a front elevation of said register, the front wall of the casing being removed; and Fig. 4 is a vertical section upon line *x x* of Fig. 3.

Letters of like name and kind refer to like parts in each of the figures.

The design of this invention is to prevent unauthorized persons from tampering with registering mechanism; and it consists, principally, in registering mechanism inclosed within a permanently-closed casing, substantially as and for the purpose hereinafter specified.

It consists, further, in a register, in which the movement of the registering mechanism is arrested at a given point by means of a seal-locked detent, substantially as and for the purpose hereinafter set forth.

In the annexed drawings, A represents a metal casing, which is rectangular in front elevation, and has its walls permanently secured together. Extending horizontally between and journaled within the front and rear walls of the casing A are three shafts, B, C, and D, upon each of which, except the first, B, is secured a toothed wheel, E and F, respectively, which wheels are respectively engaged by two pinions, *b* and *c*, that are secured upon said shafts B and C, the arrangement being such as to cause said shafts C and D and wheels E and F to be rotated by the revolution of the shaft B, the relative proportions of said wheels and their engaging-pinions being such as to cause each of the former to make one complete revolution whenever the latter revolves ten times. Upon the front side of each wheel E and F, near its edge, is provided, at equidistant points, a series of numerals from 1 to 0 inclusive, while within the front wall of the casing A are provided openings *a*, through which the numeral that is at the upper side of each wheel or dial may be seen. A dial, G, corresponding in dimensions to the dials E and F, and, like them, provided with numerals, is secured to and revolves with the first shaft B, and has its upper numeral exposed to view through an opening, *a*, in the casing. The shaft B projects through the rear wall of the casing, where it is engaged by suitable means for causing rotation, when it will be seen that for each one-tenth of a revolution in the direction shown by the arrow in Fig. 3 a different numeral will be caused to appear at the aperture in front of the dial G, while for each complete revolution of said dial G a different and next higher numeral will appear at the aperture in front of the second dial E.

If the dials are all arranged with 0 in sight, after the first complete revolution of the first dial G the numeral 1 will appear at the aperture in front of the second dial E, and when the latter has made one complete revolution (representing ten revolutions of said dial G) the third dial F will have moved until the numeral 1 appears at its aperture.

By this arrangement the numerals of the right-hand dial represent units, those of the next dial tens, the third dial hundreds, &c., so that by combining the numerals which appear in sight their sum will represent the tenths of a revolution of the shaft B.

By permanently closing the casing A all tampering with the registering mechanism is prevented; but in order that said mechanism may not be operated until any desired number less than that before shown is indicated, the following-described means are employed: Upon the face of the last dial F is provided a stud, *f*, which, when the numeral 9 appears at the aperture in front of said dial, engages with a stop, H, that passes inward through the casing A and prevents said dial and the recording mechanism from moving forward. The outer end of the stop or detent H is secured upon the casing of the register by means of a screw, I, which passes through said detent, and has its threaded end contained within a correspondingly-threaded opening in said casing. The head *i* of said screw is contained within a recess, *h*, in said detent, and outside of said head, within said recess, is left a sufficient space for the reception of a seal.

When the fastening-screw I is in place and its head covered by a seal, the latter must be removed before the detent can be withdrawn and the registering mechanism turned forward, by which means such interference with the register by unauthorized persons can be detected.

Having thus fully set forth the nature and merits of this invention, what is claimed as new is—

1. A register for indicating numbers in which the registering mechanism is contained within a permanently-closed casing, substantially as and for the purpose specified.

2. A register for indicating numbers in which the movement of the registering mechanism is arrested at a given point by means of a seal-locked detent, substantially as and for the purpose set forth.

In testimony whereof I have hereunto set my hand this 30th day of March, 1878.

WILLIAM F. BEASLEY.

Witnesses:
GEO. S. PRINDLE,
HENRY C. HAZARD.